US010030631B2

(12) United States Patent
Couchman et al.

(10) Patent No.: US 10,030,631 B2
(45) Date of Patent: Jul. 24, 2018

(54) TILT DAMPING OF A FLOATING WIND TURBINE

(71) Applicant: MHI VESTAS OFFSHORE WIND A/S, Aarhus (DK)

(72) Inventors: Ian Couchman, London (GB); Robert Bowyer, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 290 days.

(21) Appl. No.: 14/894,878

(22) PCT Filed: May 28, 2014

(86) PCT No.: PCT/DK2014/050149
§ 371 (c)(1),
(2) Date: Nov. 30, 2015

(87) PCT Pub. No.: WO2014/191001
PCT Pub. Date: Dec. 4, 2014

(65) Prior Publication Data
US 2016/0123302 A1 May 5, 2016

(30) Foreign Application Priority Data
May 30, 2013 (DK) .................................. 2013 70299

(51) Int. Cl.
F03D 7/02 (2006.01)
F03D 7/04 (2006.01)
(Continued)

(52) U.S. Cl.
CPC ............. F03D 7/0296 (2013.01); F03D 1/06 (2013.01); F03D 7/0224 (2013.01); F03D 7/043 (2013.01);
(Continued)

(58) Field of Classification Search
CPC ........ F03D 7/0296; F03D 80/80; F03D 17/00; F03D 13/20; F03D 9/25; F03D 7/043;
(Continued)

(56) References Cited

U.S. PATENT DOCUMENTS 8,433,425 B2 * 4/2013 Vasudevarao ........... F03D 7/048
290/44
8,922,042 B2 * 12/2014 Ide ........................ F03D 7/0204
290/44
(Continued)

FOREIGN PATENT DOCUMENTS

EP 1719910 A1 11/2006
EP 2107236 A1 10/2009
(Continued)

OTHER PUBLICATIONS

Tore Bakka et al.: "Gain Scheduling for Output [Infinity] Control of Offshore Wind Turbine", Jun. 17, 2012, p. 496.
(Continued)

Primary Examiner — Ramesh Patel
(74) Attorney, Agent, or Firm — Patterson+ Sheridan, LLP

(57) ABSTRACT

The present invention relates to methods and apparatus for removing or substantially reducing negative damping effects on a floating wind turbine. An operating point signal is received and a gain scheduling parameter is determined based on the received operating point signal. An input signal is then gain scheduled by the gain scheduling parameter and based on at least the gain scheduled input signal the negative damping effects on a floating wind turbine can be removed or substantially reduced.

28 Claims, 6 Drawing Sheets

(51) Int. Cl.
*F03D 9/00* (2016.01)
*F03D 1/06* (2006.01)
*F03D 9/25* (2016.01)
*F03D 17/00* (2016.01)
*F03D 13/20* (2016.01)
*F03D 80/80* (2016.01)

(52) U.S. Cl.
CPC ........... *F03D 9/25* (2016.05); *F03D 13/20* (2016.05); *F03D 17/00* (2016.05); *F03D 80/80* (2016.05); *F05B 2240/93* (2013.01); *Y02E 10/721* (2013.01); *Y02E 10/723* (2013.01)

(58) Field of Classification Search
CPC ....... F03D 1/06; F03D 7/0224; Y02E 10/721; Y02E 10/723; F05B 2240/93
See application file for complete search history.

(56) References Cited

U.S. PATENT DOCUMENTS

| | | | | |
|---|---|---|---|---|
| 9,777,706 B2* | 10/2017 | Couchman | ............ | F03D 7/0204 |
| 9,797,376 B2* | 10/2017 | Bowyer | ................. | F03D 7/042 |
| 2002/0029097 A1* | 3/2002 | Pionzio, Jr. | ............. | F03D 7/047 |
| | | | | 700/286 |
| 2006/0033338 A1 | 2/2006 | Wilson | | |
| 2009/0281677 A1* | 11/2009 | Botich | .................. | G06Q 10/00 |
| | | | | 700/295 |
| 2011/0140420 A1 | 6/2011 | Loh et al. | | |
| 2011/0193423 A1* | 8/2011 | Stalker | ....................... | H02J 3/14 |
| | | | | 307/154 |
| 2015/0147174 A1* | 5/2015 | Couchman | ............. | F03D 7/047 |
| | | | | 416/1 |
| 2015/0211484 A1* | 7/2015 | Couchman | ............ | F03D 7/0204 |
| | | | | 416/1 |
| 2015/0275850 A1* | 10/2015 | Numajiri | ................ | F03D 80/50 |
| | | | | 290/55 |

FOREIGN PATENT DOCUMENTS

| | | |
|---|---|---|
| EP | 2420806 A1 | 2/2012 |
| GB | 2466649 A | 7/2010 |
| WO | 2007053031 A1 | 5/2007 |
| WO | 2007089136 A2 | 8/2007 |
| WO | 2008081232 A1 | 7/2008 |
| WO | 2010060772 A2 | 6/2010 |
| WO | 2010139613 A2 | 12/2010 |

OTHER PUBLICATIONS

International Search Report for PCT/DK2014/050149, dated Aug. 28, 2014.
Danish Search Report for PA 2013 70299, dated Jan. 9, 2014.

* cited by examiner

TILT DAMPING OF A FLOATING WIND TURBINE

The present invention relates to Tilt Damping and in, particular, to Tilt Damping for a floating wind turbine to reduce or eliminate an effect of a floating platform tilt oscillations.

A wind turbine effectively converts kinetic energy of the wind into electrical energy via electrical and mechanical systems in the wind turbine. Typically, a wind turbine includes rotor blades connected to a hub where the hub is attached to a nacelle. The nacelle houses several electrical and mechanical systems, e.g. generator, converter, drive shafts, and so on. The nacelle is typically attached to a tower so that the nacelle and therefore the rotor blades are at an appropriate height above the tower foundations.

Wind turbines have traditionally been located onshore, in areas where the wind conditions are suitable to generate electrical power. For onshore wind turbines the tower foundations are in contact with the ground in order to provide a solid base for the wind turbine structure.

However, with fewer suitable locations for onshore wind turbines, in particular in some countries where there is limited real estate to house a wind turbine park or where the remaining locations are simply not suitable in terms of the wind conditions, alternative solutions are required.

One such solution is to locate wind turbine parks offshore. Wind turbines that are located close to shore, for example in water depths less than 30 meters, the tower foundations can be installed in contact with the sea bed to again provide a solid foundation to support the wind turbine. However, for wind turbines located further offshore it is virtually impossible, or cost inhibitive, to physically install the foundations of the wind turbine in contact with the sea bed. Thus, for these offshore wind turbines it is expected that the wind turbine will be attached to some form of floating platform.

One problem associated with the control of offshore wind turbines relates to the phenomenon of negative damping. Positive damping indicates that oscillations or vibrations will be damped if the system is left to itself, in other words, a force acts to oppose the oscillations or vibrations to keep the system stable. Negative damping is the opposite to positive damping where oscillations or vibrations, once started, will increase and cause the system to be unstable, in other words, a force acts to increase the oscillations or vibrations.

Negative damping is a significant problem for wind turbines and, in particular, for floating wind turbines. It is therefore preferable to be able to control a wind turbine to provide tilt damping to prevent, or significantly reduce, the negative damping effects that may be caused, at least in part, by the floating platform tilt oscillations.

Accordingly, the present invention as claimed seeks to address, at least in part, one or more of the problems/disadvantages described hereinabove.

According to a first aspect of the present invention there is provided a method comprising: receiving an operating point signal; determining a gain scheduling parameter based on at least the received operating point signal; receiving an input signal; generating a signal proportional to a nacelle velocity based on the input signal; and multiplying the signal proportional to the nacelle velocity by the determined gain scheduling parameter to generate a tilt damping signal.

Therefore, a tilt damping signal can be generated based on one or more operating points and a gain scheduled signal that is proportional to the nacelle velocity. The operating points may be one or more of a pitch angle of the turbine blades, generator speed, generator torque, rotor speed, wind speed, power output, or any other operating point in the wind turbine. The tilt damping signal generated advantageously enables negative damping effects on, or affecting, a floating wind turbine to be overcome or substantially reduced.

The method may further comprise modifying a Pitch Demand Signal based on the generated tilt damping signal. The pitch demand signal is typically generated by a wind turbine controller and used by a pitch control system to set the pitch angle of one or more wind turbine blades. The pitch demand signal may be modified, for example, by a combiner, by the generated tilt damping signal so that the resultant modified pitch demand signal compensates for the negative damping on the floating wind turbine, where the pitch demand signal may be transmitted or provided to the pitch control system to control the pitch angle of the turbine blades accordingly.

The input signal may be a nacelle velocity signal.

The input signal may be an acceleration signal, wherein the acceleration signal may include acceleration measurements relating to a nacelle, and generating the signal proportional to the nacelle velocity may comprise integrating the acceleration signal, wherein the integrator may be an anti-wind-up leaky integrator. Presently, it is difficult to measure the velocity of a nacelle of a wind turbine directly and so the input signal may be an acceleration signal which may be integrated in order to generate a signal proportional to the velocity of the nacelle.

The method may further comprise filtering the received input signal to remove, or substantially reduce, frequency components that do not relate to a floating platform natural frequency.

According to a second aspect of the present invention there is provided a method comprising: receiving an operating point signal; determining a gain scheduling parameter based on at least the received operating point signal; receiving an acceleration signal relating to the acceleration of a floating wind turbine; multiplying the acceleration signal by the determined gain scheduling parameter to generate a gain scheduled acceleration signal; and inputting the generated gain scheduled acceleration signal to a turbine controller of the floating wind turbine, such that a pitch demand signal which includes a tilt damping component can be generated by the turbine controller based on at least the gain scheduled acceleration signal and a generator speed error signal.

Therefore, based on one or more operating points and a gain scheduled acceleration signal a pitch demand signal can be generated which compensates for negative damping effects on a floating wind turbine.

The method may further comprise multiplying the gain scheduled acceleration signal by a further gain parameter wherein the further gain parameter may be based on one or more gains applied in the turbine controller. In order to compensate for gains which may be applied in a turbine controller when generating the pitch demand signal an additional gain may be applied to the previously gain scheduled acceleration signal. Alternatively or additionally, the gain scheduling parameter may be modified to compensate for one or more gains that may be applied by the turbine controller to generate the pitch demand signal.

The method may further comprise combining the gain scheduled acceleration signal with the generator speed error signal; and integrating the combined signal to generate the pitch demand signal.

The method may further comprise combining the generated pitch demand signal with a gain scheduled generator speed error signal.

The method may further comprise multiplying the generated pitch demand signal by a gain parameter.

The method may further comprise filtering the received acceleration signal to remove, or substantially reduce, frequency components that do not relate to a floating platform natural frequency.

The method may further comprise filtering and time delaying the operating point signal.

The operating point signal may be a pitch angle signal.

The step of determining the gain scheduling parameter may comprise identifying the gain scheduling parameter from a predefined lookup table of the operating point to gain scheduling parameter.

According to a third aspect of the present invention there is provided an apparatus comprising: a first input configured to receive an operating point signal; a gain scheduling component configured to determine a gain scheduling parameter based on at least the received operating point signal; a second input configured to receive an input signal; a component configured to generate a signal proportional to a nacelle velocity based on the input signal; and the gain scheduling component is further configured to multiply the signal proportional to the nacelle velocity by the determined gain scheduling parameter to generate a tilt damping signal.

According to a fourth aspect of the present invention there is provided an apparatus configured to: receive an operating point signal; determine a gain scheduling parameter based on at least the received operating point signal; receive an input signal; generate a signal proportional to a nacelle velocity based on the input signal; and multiply the signal proportional to the nacelle velocity by the determined gain scheduling parameter to generate a tilt damping signal.

The apparatus may further comprise a combiner configured to modify a Pitch Demand Signal based on the generated tilt damping signal.

The input signal may be a nacelle velocity signal.

The input signal may be an acceleration signal, wherein the acceleration signal may include acceleration measurements relating to a nacelle, and the component configured to generate the signal proportional to the nacelle velocity may comprise an anti-wind-up leaky integrator configured to integrate the acceleration signal.

The apparatus may further comprise a filter configured to filter the received input signal to remove, or substantially reduce, frequency components that do not relate to a floating platform natural frequency.

The first input and the second input may be the same input or different inputs.

According to a fifth aspect of the present invention there is provided an apparatus comprising: a first input configured to receive an operating point signal; a gain scheduling component configured to determine a gain scheduling parameter based on at least the received operating point signal; a second input configured to receive an acceleration signal relating to the acceleration of a floating wind turbine; the gain scheduling component further configured to multiply the acceleration signal by the determined gain scheduling parameter to generate a gain scheduled acceleration signal; and an output configured to transmit the gain scheduled acceleration signal to a turbine controller of the floating wind turbine, such that a pitch demand signal which includes a tilt damping component can be generated by the turbine controller based on at least the gain scheduled acceleration signal and a generator speed error signal.

According to a sixth aspect of the present invention there is provided an apparatus configured to receive an operating point signal; determine a gain scheduling parameter based on at least the received operating point signal; receive an acceleration signal relating to the acceleration of a floating wind turbine; multiply the acceleration signal by the determined gain scheduling parameter to generate a gain scheduled acceleration signal; and input the generated gain scheduled acceleration signal to a turbine controller of the floating wind turbine, such that a pitch demand signal which includes a tilt damping component can be generated by the turbine controller based on at least the gain scheduled acceleration signal and a generator speed error signal.

The apparatus may further comprise a gain component configured to multiply the gain scheduled acceleration signal by a further gain parameter wherein the further gain parameter may be based on one or more gains applied in the turbine controller.

The apparatus may further comprise a first combiner configured to combine the gain scheduled acceleration signal with the generator speed error signal; and an integrator configured to integrate the combined signal to generate the pitch demand signal.

The apparatus may further comprise a second combiner configured to combine the generated pitch demand signal with a gain scheduled generator speed error signal.

The apparatus may further comprise a gain component configured to multiply the generated pitch demand signal by a gain parameter.

The apparatus may further comprising a filter configured to filter the received acceleration signal to remove, or substantially reduce, frequency components that do not relate to a floating platform natural frequency.

The first input and second input may be the same input or different inputs.

The apparatus may further comprise a filter configured to filter and time delaying the operating point signal.

The operating point signal may be a pitch angle signal.

The gain scheduling component may be further configured to identify the gain scheduling parameter from a predefined lookup table of the operating point to gain scheduling parameter.

Any or all of the features and/or any or all of the different aspects described hereinabove may be combined in order to advantageously remove or substantially reduce the negative damping effects for a floating wind turbine.

As a skilled person in the art will appreciate, the apparatus may be configured to perform the functions and features described hereinabove in many different ways.

For example, the apparatus may be configured by hardware and/or software to perform any or all of the necessary functions and tasks in accordance with aspects of the present invention.

Embodiments of the present invention will now be described, by way of example only, and with reference to the accompanying Figures, in which.

Figure 1:
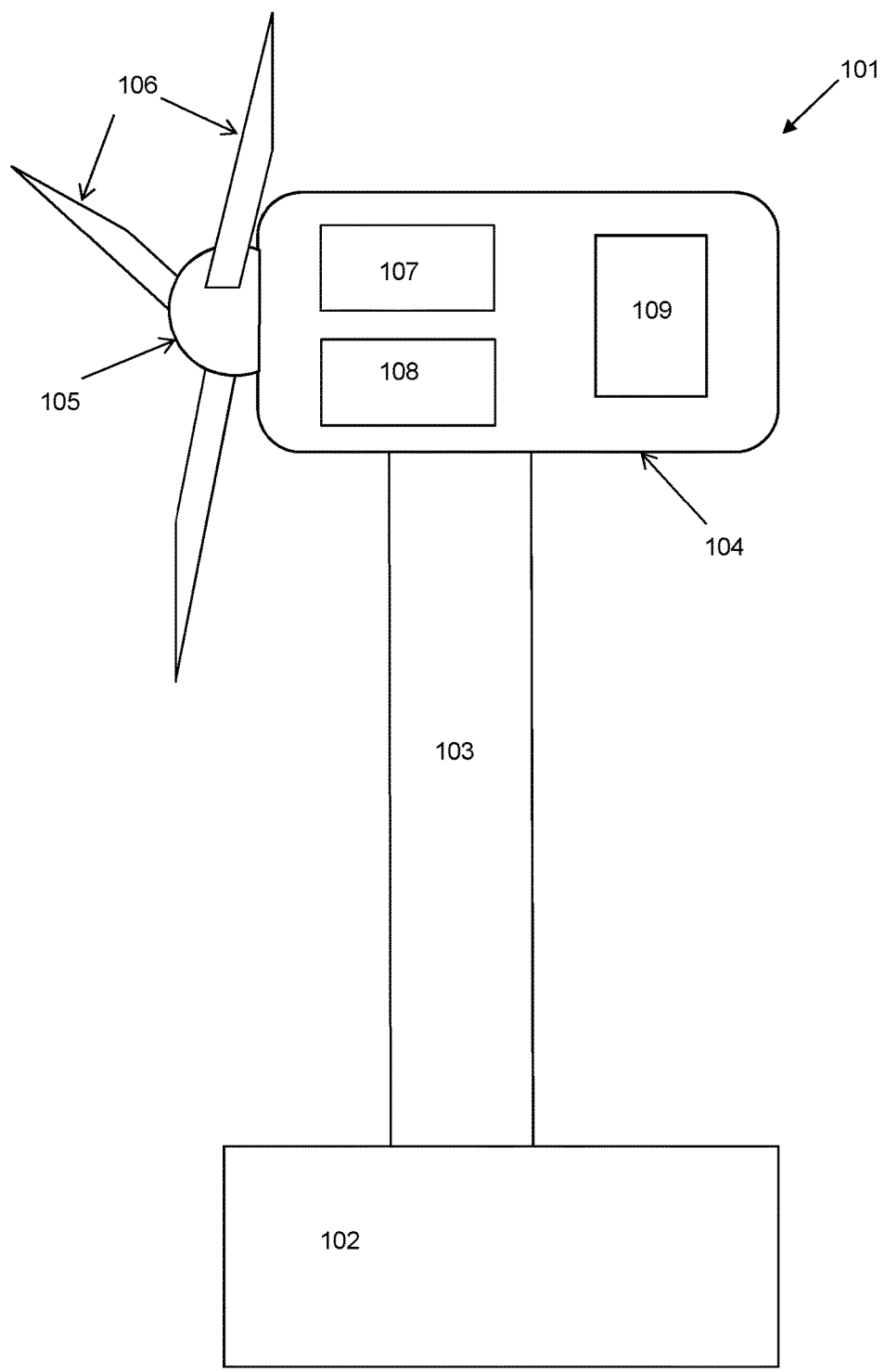
FIG. 1 shows a simplified schematic of a floating wind turbine according to many embodiments of the present invention.

With reference to FIG. 1, a floating wind turbine 101 typically includes a floating platform 102, a tower 103 attached to the floating platform and a nacelle 104 attached to the tower 102.

The nacelle 104 may include one or more turbine controllers 109 (e.g. a Full Load Controller (FLC), a Partial Load Controller (PLC) and so on), and may typically house various mechanical, electrical and hydraulic systems (not shown for ease of illustration) to enable the wind turbine to convert the kinetic wind energy into electrical power output.

The FLC refers to a turbine controller that is used to control the operation of the wind turbine at full load, e.g. when the wind turbine is operating at rated power. The PLC refers to a turbine controller that is used to control the operation of the wind turbine at partial load, e.g. when the wind turbine is operating at below rated power. The FLC and PLC may be the same turbine controller or separate turbine controllers. In the following described embodiments, the FLC will be referred to however, as will be appreciated, the embodiments can relate to the PLC or to one or more other turbine controllers suitable for the purpose of implementing the embodiments of the present invention.

A hub 105 is connected to the nacelle 104 and one or more turbine blades 106 are attached to the hub 105. In the example shown in FIG. 1, the floating wind turbine 101 includes three turbine blades 106 however, as will be appreciated, the floating wind turbine 101 may include any number of turbine blades 106.

The hub 105 and/or the nacelle 104 may also house or include one or more pitch control systems 107, to enable the turbine blades 106 to be pitched, and a yaw control system 108, to enable the nacelle to be yawed.

In order to address the problem of negative damping for floating wind turbines, it has been identified that a pitch angle for the wind turbine blades needs to be determined which enables the wind turbine to counter the effects of the negative damping.

Typically, the FLC generates a pitch demand signal for the pitch system based on, for example, a generator speed error. Therefore, in order to counter the effects of the negative damping on the wind turbine, the pitch demand signal generated by the FLC is modified.

In one embodiment the problem of negative damping is addressed by determining a tilt damping component which is used to modify the pitch demand signal from the FLC.

In a further embodiment the same problem is addressed by modifying or providing an input signal to the FLC which then generates the pitch demand signal based on the additional input signal.

Essentially, both embodiments show two example realisations or implementations which address the same problem of negative damping by generating a pitch demand signal that removes, or substantially reduces, the effects of negative damping on a floating wind turbine.

Accordingly features relating to one embodiment may be combined with different embodiments such that the embodiments described below may not be separate and distinct but can be combined in various ways.

Furthermore, as a skilled person will appreciate, the implementation described hereinbelow are examples and encompass equivalent implementations and arrangements, e.g. in the number and/or location of gain components, and so on.

In order to address the problem of negative damping for floating wind turbines in the first embodiment, it has been identified that a parallel path modification should be made to the turbine control system to feedback a gain scheduled nacelle velocity in order to determine a tilt damping component for the pitch demand signal.

Figure 2:
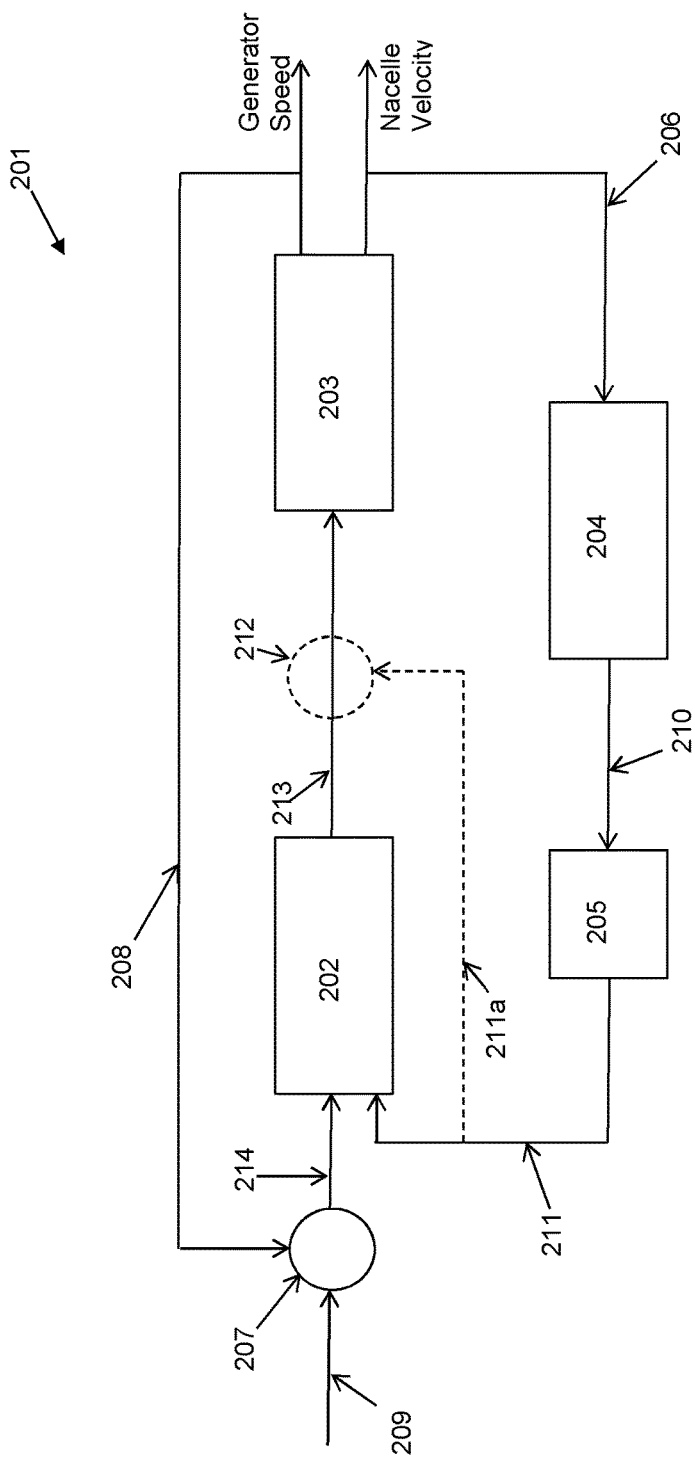
FIG. 2 shows a simplified block diagram of a wind turbine system according to many of the embodiments of the present invention.

An example structure of a wind turbine control system 201 according to this embodiment is shown in FIG. 2.

The wind turbine control system 201 may include a Full Load Controller (FLC) 202, a turbine system 203 (which may include turbine systems such as the pitch control system, yaw control system, generator control system, and so on), and a Tilt Damping Controller (TDC) 204.

The TDC 204 is shown in FIG. 2 as a separate component, however, as will be appreciated, the TDC 204 may be part of another controller, e.g. the FLC 202, or the functionality of the TDC 204 of the embodiments may be split between one or more controllers within the wind turbine control system 201. The TDC 204 and functionality may be implemented in hardware, software or any combination thereof.

As will be described in more detail hereinbelow, the TDC 204 receives an input signal, for example, a nacelle velocity signal 206 from the turbine system 203. The TDC 204 generates an output Tilt Damping Signal (TDS) 210 which may be gain scheduled 205 to generate a gain scheduled TDS 211, e.g. a tilt damping component, that is used to modify a pitch demand signal 213 generated, for example, by the FLC 202.

The FLC 202 receives the gain scheduled TDS 211 to modify the pitch demand signal 213 generated by the FLC 202, or the pitch demand signal 213 may be modified 212 by the gain scheduled TDS 211a after the FLC 202, as shown by dashed lines in FIG. 2.

The FLC 202 may also receive a reference generator speed 209 which is combined or modified 207 by a feedback of the turbine generator speed 208 of the turbine 203 in order to determine a generator speed error signal 214.

The structure of the wind turbine control system 201 shown in FIG. 2 is one example of the structure as, for example, the functionality of the TDC 204 may be incorporated in the FLC 202, the gain scheduling 205 of the TDS 210, may be incorporated into the TDC 204, the FLC 205, and so on. As a skilled person in the art will appreciate, the entities shown in FIG. 2 may be combined, or may be re-ordered depending on the actual implementation of the wind turbine control system 201, to implement the present invention.

As described hereinabove, the TDC 204 receives as an input signal a feedback of the nacelle velocity 206 from the nacelle of the wind turbine, or a signal proportional to the nacelle velocity 206. The nacelle velocity may be measured directly from sensors in the wind turbine or may be estimated, for example, from the nacelle acceleration.

As it is presently difficult to measure the nacelle velocity directly as the necessary sensors are not yet widely available then in the following embodiments the nacelle velocity will be estimated from the nacelle acceleration as wind turbines typically include one or more acceleration sensors in the nacelle. As such, in the following embodiments the input signal 206 received by the TDC 204 will be an acceleration signal.

Figure 3:
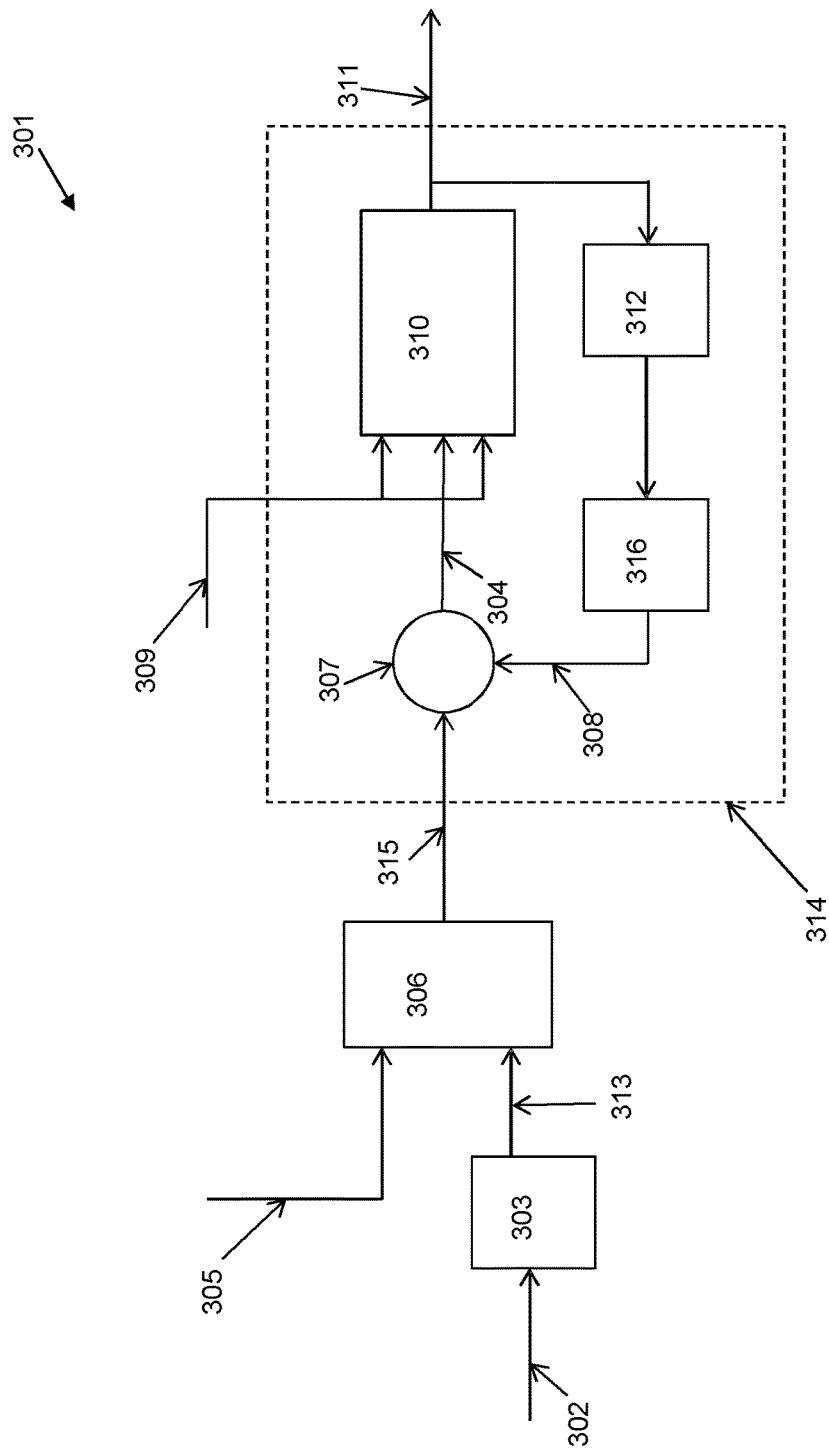
FIG. 3 shows a simplified block diagram of a Tilt Damping Controller according to many of the embodiments of the present invention.

FIG. 3 shows an example of the structure and implementation of a TDC 301. The TDC 301 receives at least one acceleration signal 302 comprising acceleration measurements from the acceleration sensors located/mounted on the nacelle of the wind turbine.

Ideally, the acceleration sensors would measure only the acceleration of the platform at its natural frequency and thus the acceleration signal would comprise components of only the natural frequency of the platform.

However, as the acceleration sensors are mounted on the nacelle then the acceleration signal will typically include components from one or more other sources. For example, the additional components may be due to motions at wave frequencies that are different to the platform natural frequency, due to oscillations resulting from tower vibrations, due to the tower natural frequency, due to 3P frequencies, and so on.

Therefore, it is preferable that the additional frequency components are removed or substantially reduced so that the acceleration signal primarily comprises only a component relating to the platform natural frequency. In order to remove or substantially reduce the additional frequency components the acceleration signal 302 may be filtered 303 by, for example, a first order low-pass filter.

In the example structure shown in FIG. 3, the acceleration signal 302 is filtered prior to the acceleration signal being integrated by the integrator 314 to generate a signal relating to the nacelle velocity, or generate a signal proportional to the nacelle velocity. However, as will be appreciated, the resulting signal 311 from the integrator may alternatively be filtered.

In this embodiment the acceleration sensors are mounted on the nacelle however, as will be appreciated, the acceleration sensors may be mounted on the floating platform which may reduce the additional frequency components in the acceleration signal.

The step of filtering 303 the acceleration signal is optional, but preferable as it provides a more effective mechanism to counter the negative damping problem.

Returning to FIG. 3, a gain is applied 306 to the filtered acceleration signal 313. The gain 305 may be set or predetermined by and/or received from, for example, the FLC or the TDC 301. The higher the gain the more damping that can be achieved and the value of the gain is set or predetermined to achieve an optimal or efficient level of damping of the wind turbine. The predetermined value of the gain will be dependent on the specific wind turbine and also the conditions experienced by the wind turbine. The predetermined value of the gain 305 is applied 306 to the filtered acceleration signal 313. This step of multiplying the filtered acceleration signal by a predetermined gain value that is dependent on the specific wind turbine and/or conditions to which the turbine is subjected is again optional, but is preferable to enhance the damping control of the wind turbine.

The gain scheduled filtered acceleration signal 315 may then be integrated by integrator 314. The integrator may include a combiner 307 for combining, e.g. by addition, the gain scheduled filtered acceleration signal 315 with a feedback signal 308 where the feedback signal 308 is based on the output signal 311 of the integrator 314. The output of the integrator 314 may be used directly as feedback however, it is preferable to generate the feedback signal 308 by time delaying 312 the output signal 311 of the integrator 314 and then applying a gain 316. The output of the combiner is signal 304 which may then be provided as input to a saturation block 310.

As the acceleration sensors which provide the acceleration signal may be sensitive to sensor drift then, in this embodiment, a leaky integrator 314 is implemented (where the gain applied is less than 1) to integrate the acceleration signals which negates or substantially overcomes the sensor drift of the acceleration sensors. The leaky nature of the implemented integrator 314 prevents the TDC 301 from drifting due to steady state offsets in the acceleration measurements in the acceleration signal.

As described hereinabove, the output of the TDC 301 is a Tilt Damping Signal (TDS) which can be used to modify the pitch demand signal of the turbine controller (e.g. FLC) so that the wind turbine blades can be pitched to the appropriate pitch angle to compensate for and/or counter the negative damping effects.

The wind turbine control system typically sets pitch limits which limit the pitch demand to ensure that a problematic pitch demand is not provided to the pitch control system of the wind turbine. The modified pitch demand signal (e.g. the pitch demand signal from the FLC modified by the TDS from the TDC), could be pitch limited however, it has been identified that it is preferable to pitch limit the signals (the pitch demand signal from the turbine controller and the TDS) independently.

The advantages of independently pitch limiting the signals are that it can explicitly limit the contribution of the TDC to the pitch demand signal to a small tunable amount, it can avoid the so-called wind-up occurring and it minimizes the changes or alterations required to the turbine controller (e.g. FLC).

In order to apply pitch limits the leaky integrator 314 may be implemented as an anti-wind-up leaky integrator 314. The saturation block 310 may therefore receive as inputs at least one Tilt Damping Pitch Limit signal 309 which is used to set the pitch limit boundary.

If a single Tilt Damping Pitch Limit signal 309 is provided then it sets both the upper and lower limit. For example, if the Tilt Damping Pitch Limit signal is 5 degrees then the upper limit is positive 5 degrees and the lower limit is negative 5 degrees.

Alternatively, two input Tilt Damping Pitch Limit signals may be received by the saturation block 310, the first being an upper Tilt Damping Pitch Limit signal and the second a lower Tilt Damping Pitch Limit signal where the upper Tilt Damping Pitch Limit signal and the a lower Tilt Damping Pitch Limit signal may be the same absolute value or a different absolute value.

The Tilt Damping Pitch Limit signal(s) 309 may be set in the TDC 301, the FLC, or in any other controller or device in or operatively connected to the wind turbine. The pitch limits are typically predetermined and set for a wind turbine.

The output of the integrator 314 is the signal 311, which corresponds to, or is based on e.g. proportional to, the estimated nacelle velocity determined from the nacelle acceleration.

Wind turbines, including floating wind turbines, are inherently nonlinear systems such that the relationship between pitch and generator torque and also between pitch and thrust depends on one or more operating points of the wind turbine, e.g. wind speed, pitch angle, generator speed, and so on.

It has been identified that the Tilt Damping Signal (TDS) output from the TDC should therefore be gain scheduled in order to be able to choose a level of damping based on the operating points of the wind turbine in order to make the damping the same for all operating points of the wind turbine. This advantageously enables the TDS to be tunable.

Figure 4:
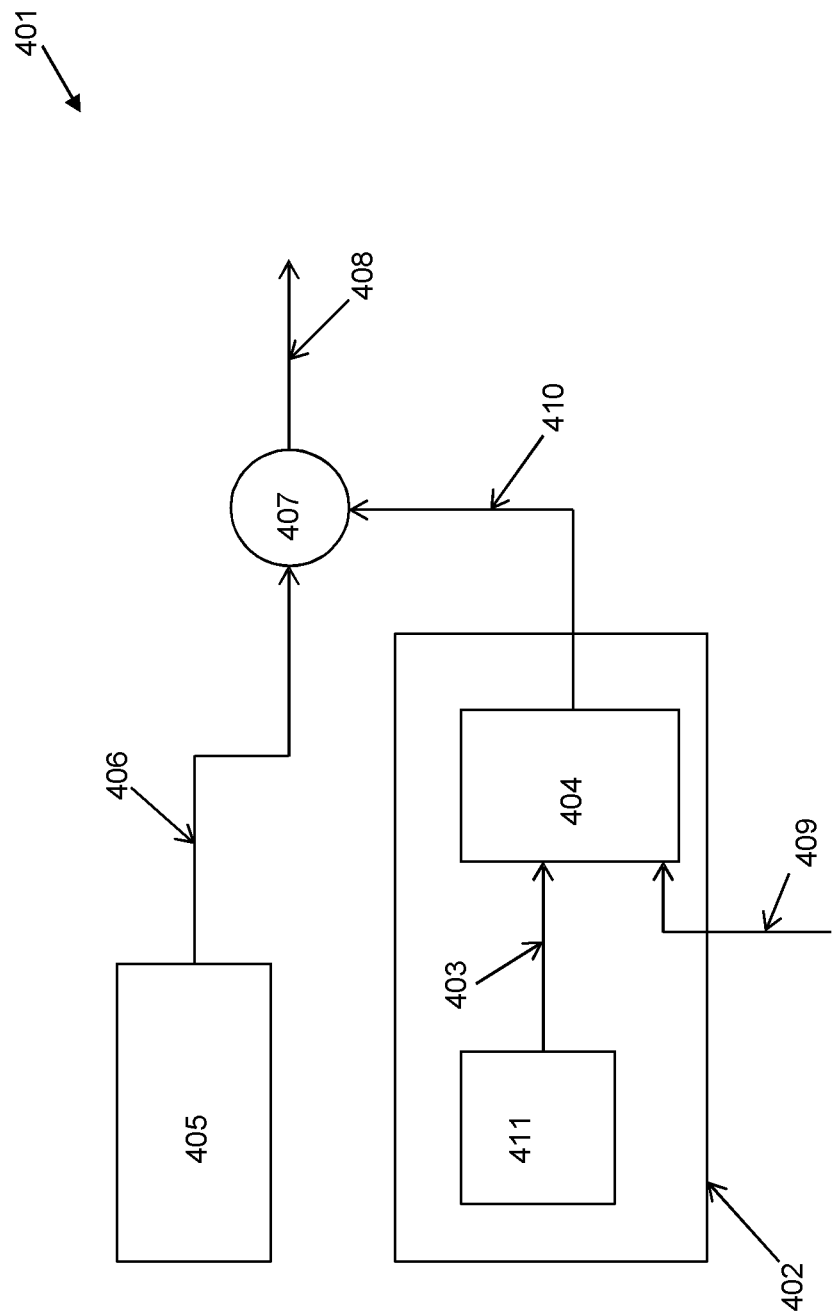
FIG. 4 shows a simplified block diagram according to many of the embodiments of the present invention.

FIG. 4 shows an example structure 401 for implementing the gain scheduling of the output signal 403 of the integrator 411 (which corresponds to output signal 311 of the integrator 314 in FIG. 3) in which the gain scheduling of the signal 403 is implemented by a gain scheduling component 404 that, in this embodiment, is in the TDC 402.

However, as will be appreciated, the gain scheduling of the signal 403 may alternatively be implemented by hardware and/or software in the in the FLC 405, by hardware and/or software in a separate gain scheduling component/module, or any combination thereof.

The gain scheduling to be applied to the output signal 403 from the integrator 411 may be based on one or more operating points of the floating wind turbine. For example, the gain scheduling may be based on one or more of pitch angle, generator speed, rotor speed, wind speed, power output, and so on. The gain scheduling component 404 may receive as an input one or more operating point signals which relate to the operating points, or are based on the operating points, used for the gain scheduling.

Figure 5:
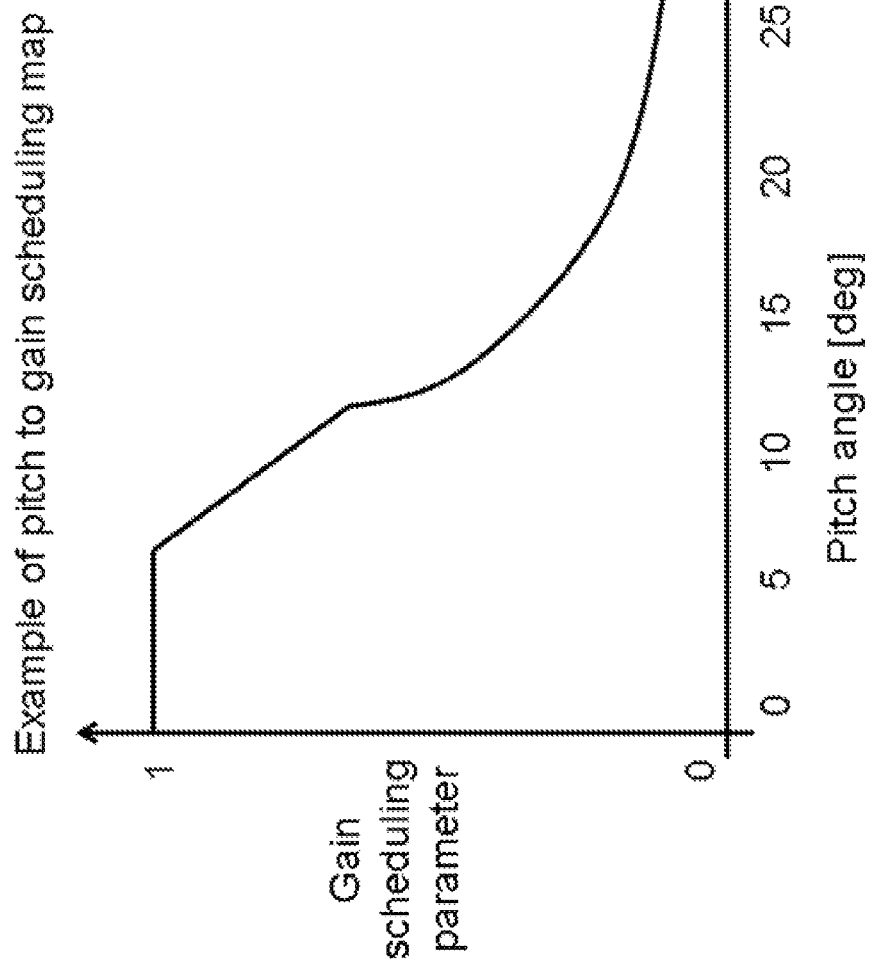
FIG. 5 shows a simplified gain scheduling map according to many of the embodiments of the present invention.

In this embodiment, the gain scheduling of the output signal 403 of the integrator 411 is based on a pitch to thrust map and the operating point is defined by pitch angle, an example of which is shown in FIG. 5. In this embodiment, the pitch to thrust gain scheduling is preferred as it provides a substantially constant increase in damping across all operating points of the wind turbine. However, as will be appreciated, the gain scheduling may be based on one or more other maps, for example, a pitch to generator torque map and/or any other operating points.

The pitch to thrust map may be generated offline for each floating wind turbine where the pitch to thrust map may be the same for each type of wind turbine but different for wind turbines of different types. Alternatively or additionally, the pitch to thrust map may be generated online and/or in real time.

As, in this example, the operating point for the gain scheduling is based on the pitch angle then the gain scheduling component 404 of the TDC 402 may receive a filtered and/or time delayed pitch angle signal 409 as the operating point signal. The pitch signal is filtered so as to effectively smooth the pitch angle over a predetermined time period, for example 10 seconds. This is to ensure that the gain scheduling parameter determined from the pitch to thrust map is based on the pitch angle over the previous time period so as to prevent a self-dependence that may cause an unwanted algebraic loop if the current or desired pitch angle is used.

The pitch angle signal may be received from the pitch system, from the turbine controller (e.g. the FLC), be the output of an integrator in the FLC that is used to generate the pitch demand signal, and so on. If different or further operating points are utilized in the gain scheduling then the corresponding operating point signals may be received from the relevant systems or controllers.

The gain scheduling parameter may then be determined by identifying the gain scheduling parameter from the pitch to thrust map shown in FIG. 5 that corresponds to the received pitch angle.

As will be appreciated, the pitch to thrust map may additionally or alternatively be implemented or generated as a lookup table or any other suitable format to enable the appropriate gain scheduling parameter to be identified or determined.

Once the gain scheduling parameter is identified then the output signal 403 is multiplied by the determined gain scheduling parameter in the gain scheduling component 404 to generate the gain scheduled TDS 410.

The TDS 410 may then be utilized as the tilt damping component to modify the Pitch Demand Signal 406 from the FLC 405. For example, the TDS 410, or tilt damping component, may be combined with the pitch demand signal 406 from the FLC 405 via a combiner 407 to generate a modified pitch demand signal 408. In this example, the gain scheduled TDS 410 is combined with the pitch demand signal 406 by adding the two signals together in the combiner 407.

The resultant modified Pitch Demand Signal 408 may then be provided to the turbine control system, in particular, the pitch system, so that the turbine blades can be pitched appropriately to counter the negative damping of the floating wind turbine.

By determining the Tilt Damping Signal based on the nacelle velocity and subsequently gain scheduling the Tilt Damping Signal based on a pitch to thrust map prior to modifying the Pitch Demand Signal, the present invention effectively removes, or substantially removes, oscillations in the pitch signal resulting from the tilt oscillations of the floating platform thereby negating or substantially negating the negative damping effects on the wind turbine.

In the above described embodiment, an example implementation was given in order to determine or generate a modified pitch demand signal. The structure of the implementation may encompass equivalent structures, for example, by varying the location and/or number of gain stages/components in structure to generate a pitch demand signal that includes a tilt damping component to overcome or substantially reduce the negative damping effects on the floating wind turbine.

A second embodiment of the present invention will now be described with reference to FIG. 6. The second embodiment is a further implementation to generate a pitch demand signal that overcomes or substantially reduces the negative damping effects on the floating wind turbine.

Figure 6:
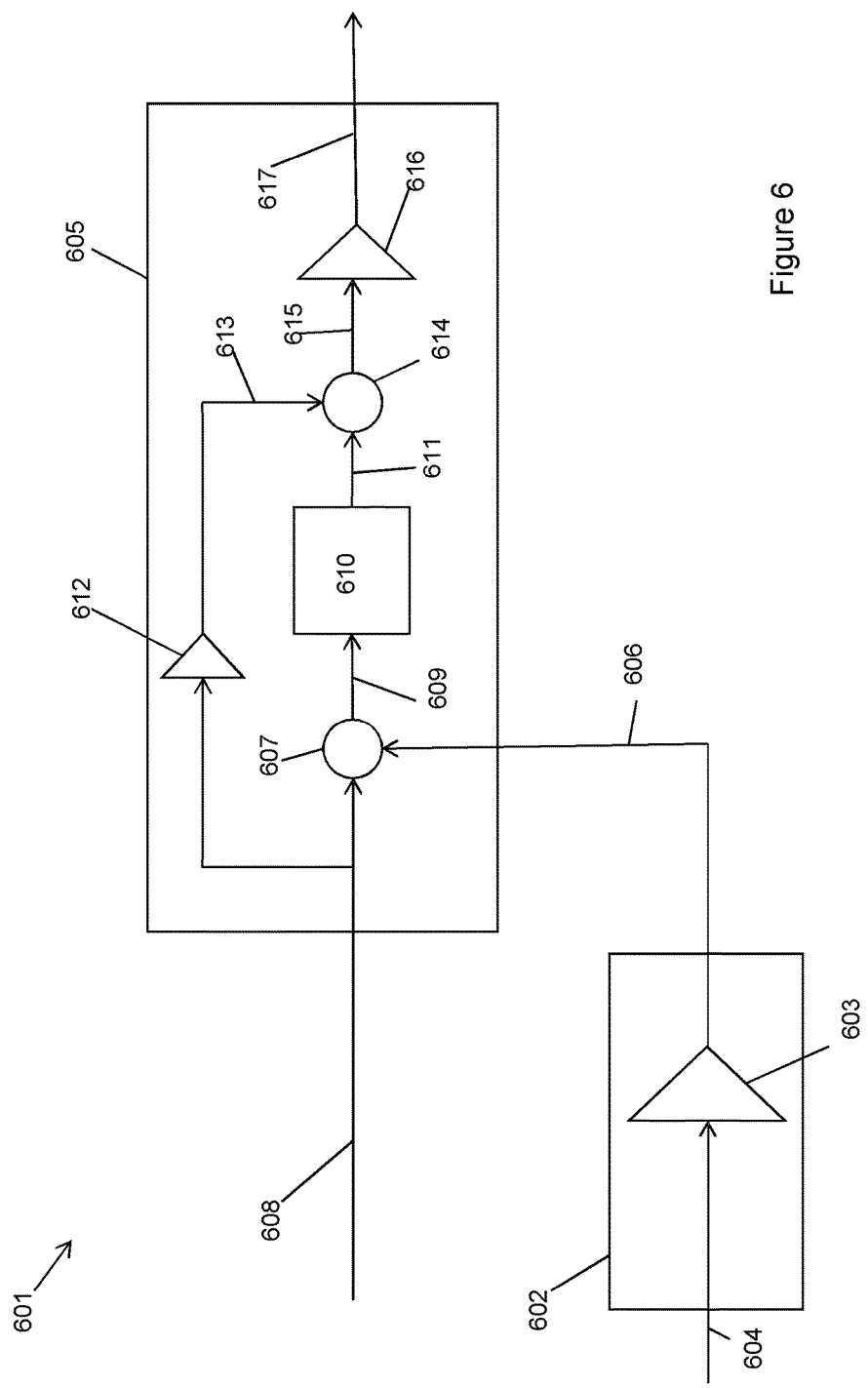
FIG. 6 shows a simplified block diagram of a system according to many of the embodiments of the present invention.

FIG. 6 shows a system 601 according to the second embodiment where the system 601 includes a Tilt Damping Controller (TDC) 602. The TDC 602 includes a gain scheduling component 603 which receives as input an acceleration signal 604. The acceleration signal comprises acceleration measurements from acceleration sensors located/mounted on the nacelle of the wind turbine.

As described hereinabove, the acceleration sensors would ideally measure only the acceleration of the platform at its natural frequency and thus the acceleration signal would comprise components of only the natural frequency of the platform.

However, as the acceleration sensors are mounted on the nacelle then the acceleration signal will typically include components from one or more other sources. For example, the additional components may be due to motions at wave frequencies that are different to the platform natural frequency, due to oscillations resulting from tower vibrations, due to the tower natural frequency, due to 3P frequencies, and so on.

Therefore, it is preferable that the additional frequency components are removed or substantially reduced so that the acceleration signal primarily comprises only a component relating to the platform natural frequency. In order to remove or substantially reduce the additional frequency components the acceleration signal 604 may be filtered by, for example, a first order low-pass filter.

The gain scheduling component 603 is similar to the gain scheduling component described hereinabove in relation to the first embodiment. Accordingly, the gain scheduling to be applied to the acceleration signal 604 may be based on one or more operating points of the floating wind turbine. For example, the gain scheduling may be based on one or more of pitch angle, generator speed, rotor speed, wind speed, power output, and so on.

In this embodiment, the gain scheduling of the acceleration signal 604 is based on a pitch to thrust map and the operating point is defined by pitch angle, an example of which is shown in FIG. 5. In this embodiment, the pitch to thrust gain scheduling is preferred as it provides a substantially constant increase in damping across all operating points of the wind turbine. However, as will be appreciated, the gain scheduling may be based on one or more other maps, for example, a pitch to generator torque map and/or any other operating points.

The operating point for the gain scheduling is based on the pitch angle and therefore the gain scheduling component 603 of the TDC 602 may receive a filtered pitch signal as an input operating point signal, as previously described in relation to the first embodiment.

The gain scheduling parameter may then be determined by identifying the gain scheduling parameter that corresponds to the received pitch angle from the pitch to thrust map shown in FIG. 5.

The acceleration signal 604 may then be multiplied by the determined gain scheduling parameter in the gain scheduling component 603 to generate a signal 606.

As will be described below, in this embodiment the gain scheduled acceleration signal is input to the FLC in order to generate a pitch demand signal that compensates for the negative damping effects on the wind turbine. In order to compensate for the one or more gains that may be applied by, or in, the FLC 605 the gain scheduling parameter may be modified, or one or more additional gain stages applied, based on the gains used in the FLC.

The gain scheduled signal 606 may then be provided as an input to the FLC 605 such that the FLC 605 can generate a pitch demand signal which is modified, or compensated by, a tilt damping component to overcome, or substantially reduce the negative damping effects on the wind turbine.

In this embodiment, signal 606 is input to a combiner 607 in which the signal 606 is combined with a generator speed error 608 to generate a combined signal 609 which includes therefore a component of the acceleration of the nacelle of the wind turbine in order to be able to compensate for the negative damping.

The combined signal 609 is then input to the integrator 610 of the FLC 605. The integrator 610 may be the same integrator that is typically used presently in an FLC to determine or generate a pitch demand signal. The combined signal 609 is accordingly integrated by the integrator 610 of the FLC 605 and an output signal 611 is generated by the integrator 610 which is effectively a pitch demand signal that is modified by or compensates for a tilt damping component.

The integrated signal 611 may then be combined, via combiner 614 with a signal 613, where signal 613 is the generator speed error signal 608 multiplied by a gain 612.

The combined signal 615 output from the combiner 614 may then be subject to a gain via a gain component 616. The resulting signal 617 is then a pitch demand signal that compensates for the negative damping effects of the wind turbine. The pitch demand signal is provided to the pitch control system in order to appropriately pitch the wind turbine blades to counter, or significantly reduce, the negative damping effects on the floating wind turbine.

The second embodiment shows a further implementation for generating a pitch demand signal that is modified by or compensates for a tilt damping component such that the pitch control system may pitch the floating wind turbine blades to counter, or substantially reduce, the negative damping effects on the wind turbine. In this arrangement various signals are combined and/or gain scheduled. The timing and or location of the combiners/gain scheduling are exemplary in this embodiment and a skilled person in the art would recognize that the timing and/or location of the combiners/gain scheduling may be different in order to obtain the same pitch demand signal that is modified by, or compensates for, a tilt damping component. For example, gain component 612 could be located on the input signal of the generator speed error, or additional gain components implemented before the combiner 607 and/or integrator 610.

It would also be recognized that multiple gain stages or components may be implemented, for example, in the tilt damping controller instead of a single gain 603 there could be an additional gain component for compensating for one or more gains applied inside the FLC located prior or subsequent to the gain scheduling component 603.

Therefore, as will be appreciated, the implementations shown in any of the embodiments described hereinabove are exemplary arrangements that are not limited to the specific implementations as the arrangements may encompass many equivalent structures in order to generate the pitch demand signal that compensates for the negative damping effects on the floating wind turbine.

The embodiments of the present invention advantageously reduce the magnitude of the platform tilt oscillations and the Tilt Damping Signal effectively prevents the generator speed loop from exciting the platform tilt oscillations.

Moreover, the embodiments of the present invention enable the level of damping to be set for each operating point in order to fine tune the operation of the floating wind turbine to alleviate the problems associated with negative damping.

While embodiments of the invention have been shown and described, it will be understood that such embodiments are described by way of example only. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

What is claimed is:

1. A method for use with a wind turbine comprising a nacelle, the method comprising:
   determining a gain scheduling parameter based on at least a received operating point signal describing an operating point of the wind turbine;
   receiving an input signal describing motion of the nacelle;
   generating a signal proportional to a velocity of the nacelle determined based on said input signal;
   generating a tilt damping signal by multiplying said signal proportional to said velocity by said determined gain scheduling parameter; and
   modifying a control signal for a system of the wind turbine using the tilt damping signal.

2. The method as claimed in claim 1, wherein modifying the control signal for a system of the wind turbine comprises:
   modifying a pitch demand signal for a pitch control system of the wind turbine.

3. The method as claimed in claim 1, in which said input signal is a nacelle velocity signal.

4. The method as claimed in claim 1, in which said input signal is an acceleration signal, wherein said acceleration signal includes acceleration measurements relating to the nacelle, and generating said signal proportional to said velocity comprises:
   integrating said acceleration signal using an anti-wind-up leaky integrator.

5. The method according to claim 1, further comprising:
filtering said received input signal to at least substantially reduce one or more frequency components that are unrelated to a natural frequency of a floating platform connected with the wind turbine.

6. A method for use with a floating wind turbine, the method comprising:
determining a gain scheduling parameter based on at least a received operating point signal describing an operating point of the floating wind turbine;
receiving an acceleration signal describing an acceleration of the floating wind turbine;
multiplying said acceleration signal by said determined gain scheduling parameter to generate a gain-scheduled acceleration signal; and
generating, using a turbine controller of the floating wind turbine, a pitch demand signal for a pitch control system of the floating wind turbine, the pitch demand signal comprising a tilt damping component based on the gain-scheduled acceleration signal and a generator speed error signal.

7. The method as claimed in claim 6, further comprising:
multiplying said gain-scheduled acceleration signal by a further gain parameter that is based on one or more gains applied in said turbine controller.

8. The method as claimed in claim 6, further comprising:
combining said gain-scheduled acceleration signal with said generator speed error signal in a combined signal; and
integrating said combined signal to generate said pitch demand signal.

9. The method as claimed in claim 6, further comprising:
combining said generated pitch demand signal with a gain-scheduled generator speed error signal.

10. The method as claimed in claim 6, further comprising:
multiplying said generated pitch demand signal by a gain parameter.

11. The method according to claim 6, further comprising:
filtering said received acceleration signal to at least substantially reduce one or more frequency components unrelated to a natural frequency of a floating platform of the floating wind turbine.

12. The method as claimed in claim 6, further comprising:
filtering and time delaying said operating point signal.

13. The method as claimed in claim 6, in which said operating point signal is a pitch angle signal.

14. The method according to claim 6, in which determining said gain scheduling parameter comprises:
identifying said gain scheduling parameter from a predefined lookup table relating said operating point to gain scheduling parameter.

15. An apparatus comprising:
a first input configured to receive an operating point signal describing an operating point of a wind turbine;
a second input configured to receive an input signal describing motion of a nacelle of the wind turbine;
a component configured to generate a signal proportional to a velocity of the nacelle determined based on said input signal; and
a gain scheduling component configured to:
determine a gain scheduling parameter based on at least said received operating point signal; and
multiply said signal proportional to said velocity by said determined gain scheduling parameter to generate a tilt damping signal,
wherein a control signal for a system of the wind turbine is modified using the tilt damping signal.

16. The apparatus as claimed in claim 15, further comprising:
a combiner configured to modify a pitch demand signal for a pitch control system of the wind turbine.

17. The apparatus as claimed in claim 15, in which said input signal is a nacelle velocity signal.

18. The apparatus as claimed in claim 15, in which said input signal is an acceleration signal, wherein said acceleration signal includes acceleration measurements relating to the nacelle, and said component configured to generate said signal proportional to said velocity comprises:
an anti-wind-up leaky integrator configured to integrate said acceleration signal.

19. The apparatus as claimed in claim 15, further comprising:
a filter configured to filter said received input signal to at least substantially reduce one or more frequency components that are unrelated to a natural frequency of a floating platform connected with the wind turbine.

20. The apparatus as claimed in claim 15, further comprising:
a filter configured to filter and time delay said operating point signal.

21. The apparatus as claimed in claim 15, in which said operating point signal is a pitch angle signal.

22. The apparatus as claimed in claim 15, in which said gain scheduling component is configured to:
identify said gain scheduling parameter from a predefined lookup table relating said operating point to gain scheduling parameter.

23. An apparatus comprising:
a first input configured to receive an operating point signal describing an operating point of a floating wind turbine;
a second input configured to receive an acceleration signal describing an acceleration of the floating wind turbine;
a gain scheduling component configured to:
determine a gain scheduling parameter based on at least said received operating point signal; and
multiply said acceleration signal by said determined gain scheduling parameter to generate a gain-scheduled acceleration signal; and
an output configured to transmit said gain-scheduled acceleration signal to a turbine controller of said floating wind turbine,
wherein the turbine controller is configured to generate a pitch demand signal for a pitch control system of the floating wind turbine, the pitch demand signal comprising a tilt damping component based on at least said gain-scheduled acceleration signal and a generator speed error signal.

24. The apparatus as claimed in claim 23, further comprising:
a gain component configured to multiply said gain-scheduled acceleration signal by a further gain parameter that is based on one or more gains applied in said turbine controller.

25. The apparatus as claimed in claim 23, further comprising:
a first combiner configured to combine said gain-scheduled acceleration signal with said generator speed error signal in a combined signal; and
an integrator configured to integrate said combined signal to generate said pitch demand signal.

26. The apparatus as claimed in claim 23, further comprising:

a second combiner configured to combine said generated pitch demand signal with a gain-scheduled generator speed error signal.

27. The apparatus as claimed in claim 23, further comprising:
a gain component configured to multiply said generated pitch demand signal by a gain parameter.

28. The apparatus as claimed in claim 23, further comprising:
a filter configured to at least substantially reduce, from the acceleration signal, one or more frequency components that unrelated to a natural frequency of a floating platform of the floating wind turbine.

* * * * *